United States Patent [19]

Kissin

[11] Patent Number: 5,086,135
[45] Date of Patent: Feb. 4, 1992

[54] ZIRCONIUM-BASED CATALYST COMPOSITION FOR POLYMERIZING OLEFINS AND POLYMERIZATION THEREWITH

[75] Inventor: Yury V. Kissin, East Brunswick, N.J.

[73] Assignee: Mobil Oil Corporation, Fairfax, Va.

[21] Appl. No.: 456,916

[22] Filed: Dec. 26, 1989

[51] Int. Cl.$^5$ .............................................. C08F 4/50
[52] U.S. Cl. ................................... 526/151; 526/148; 526/160; 526/348.5; 502/107; 502/115; 502/117
[58] Field of Search ............ 526/151, 160, 148, 348.5; 502/115, 107, 117

[56] References Cited

U.S. PATENT DOCUMENTS

| | | | |
|---|---|---|---|
| 2,924,593 | 2/1960 | Breslow | 526/160 |
| 4,404,344 | 9/1983 | Sinn et al. | 526/160 |
| 4,542,199 | 9/1985 | Kaminsky et al. | 526/160 |
| 4,820,786 | 4/1989 | Bacskai | 526/152 |

OTHER PUBLICATIONS

Angew. Chem. Int. Ed. Engl. 19 (1980) 5, pp. 390-392, Sinn et al.
Makromol. Chem., Rapid Commun. 5, 225-228 (1986), Kaminsky et al.
Makromol. Chem., Rapid Commun. 8, 305-310 (1987), Soga et al.
Makromol. Chem., Rapid Commun., 4, 417-421 (1983), Kaminsky et al.
U.S. Ser. No. 07/457,432 to Lo et al., filed 12/27/89.

*Primary Examiner*—Fred Teskin
*Attorney, Agent, or Firm*—Alexander J. McKillop; Charles J. Speciale; Marina V. Schneller

[57] ABSTRACT

An olefin polymerization catalyst composition contains:

(1) a zirconium compound, containing pi-bonded organic ligands of the formula:

$$Cp_m ZrA_n X_q$$

wherein Cp is unsubstituted or substituted cyclopentadienyl, m is 1, 2 or 3, A is a halogen, hydrogen, a $C_1$-$C_6$ alkyl group, a metalloalkyl or a group of the following general formula:

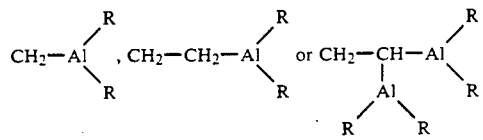

where R is a $C_1$-$C_{10}$ alkyl group, hydrogen, a halogen or a metalloalkyl group and n is 0, 1 or 2, X is a halogen, hydrogen or a $C_1$-$C_6$ alkyl group, providing that q+m+n=valence or Zr; and (2) a catalyst activator which contains a mixture of
  (i) an organoaluminum compound having the formula:

$$R_p'AlX_{(k-p)}' \text{ or } R_3'Al_2X_3'$$

where R' is a $C_1$-$C_6$ alkyl group, p is 1 or 2, X' is a halogen and k is the valence of aluminum; and
  (ii) a dialkylmagnesium compound, preferably soluble in hydrocarbons, having the formula:

$$MgR_t'' \text{ or } MgR_r''R_{(t-r)}'''$$

where R'' is a $C_2$-$C_8$ alkyl group, R''' is different than R'' and it is a $C_2$-$C_8$ alkyl group, t is the valence of magnesium, and r is about 0.01 to about 1.0.

There is also disclosed a process for polymerizing olefins in the presence of the catalyst composition.

23 Claims, No Drawings

ZIRCONIUM-BASED CATALYST COMPOSITION FOR POLYMERIZING OLEFINS AND POLYMERIZATION THEREWITH

BACKGROUND OF THE INVENTION

1. Field of the Invention

The present invention relates to a zirconium-based catalyst precursor activated with an activator (also known as a cocatalyst) comprising a mixture of two compounds, to the resulting catalyst composition, and to the use thereof in a process of polymerizing and copolymerizing olefins, especially alpha-olefins.

2. Description of Related Art

Bacskai in U.S. Pat. No. 4,820,786 describes the use of a cocatalyst comprising a mixture of dialkylaluminum halide and dialkyl magnesium to activate a solid supported titanium tetrahalide complex. The activated complex is used to prepare linear low density polyethylene by the copolymerization of ethylene and 1-butene.

It is also known that certain zirconium complexes containing pi-bonded organic ligands, such as bis(cyclopentadienyl)zirconium complexes, activated with an aluminum compound of the aluminoxane type produce olefin polymers and copolymers, such as ethylene and propylene homopolymers, ethylene-butene and ethylene-hexene copolymers, e.g., see Kaminsky et al, U.S. Pat. No. 4,542,199 and Sinn et al, U.S. Pat. No. 4,404,344, the entire contents of both of which are incorporated herein by reference.

However, although such zirconium-based catalysts are very effective olefin polymerization catalysts, the aluminoxane cocatalysts are expensive and can be utilized efficiently only if the olefin polymerization reactions are carried out in aromatic solvents (usually in toluene). Accordingly, a need exists in the art for alternative activators for such zirconium-based catalysts.

It is therefore a primary object of the present invention to provide a zirconium-based olefin polymerization catalyst composition comprising a zirconium-based catalyst precursor and an activator comprising a mixture of two compounds.

Other objects of the invention will become apparent to those skilled in the art from the following description thereof.

SUMMARY OF THE INVENTION

An olefin polymerization catalyst composition (also referred to herein as a "catalyst") of this invention comprises a catalyst precursor and a catalyst activator (cocatalyst system). The catalyst precursor comprises a zirconium compound containing pi-bonded organic ligands of the formula:

$$Cp_m \, Zr \, A_n \, X_q$$

wherein Cp is unsubstituted or substituted cyclopentadienyl, m is 1, 2 or 3, A is a halogen, hydrogen, a $C_1$-$C_6$ alkyl group, a metalloalkyl group, or a group of the following general formula:

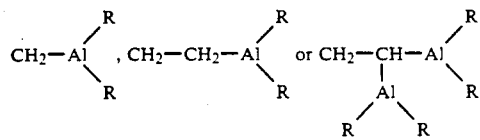

where R is a $C_1$-$C_{10}$ alkyl group, hydrogen, a halogen, or a metalloalkyl group, X is a halogen, hydrogen or a $C_1$-$C_6$ alkyl group, n is 0, 1 or 2, and q is 0, 1 or 2, providing that q+m+n is equal to the valence of zirconium.

The catalyst activator comprises a mixture of:

(i) an organoaluminum compound having the formula:

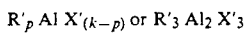

where R' is a $C_1$-$C_6$ alkyl group, p is 1 or 2, X' is a halogen and k is the valence of aluminum; and (ii) a dialkylmagnesium compound having the formula:

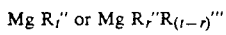

where R" is a $C_2$-$C_8$ alkyl group, R'" is different than R" and it is a $C_2$-$C_8$ alkyl group, t is the valence of magnesium and r is about 0.01 to about 1. The preferred dialkylmagnesium compounds are those soluble in hydrocarbons, such as alkanes or aromatic hydrocarbons.

The catalysts polymerize olefins, such as alpha-olefins, e.g., ethylene, propylene, butene or hexene, or mixtures thereof, to homopolymers or copolymers having density of about 0.850 to about 0.970 g/cc. The olefin polymerization reactions can be carried out with this catalyst composition in both the aromatic and aliphatic hydrocarbon media.

DETAILED DESCRIPTION OF THE INVENTION

The zirconium compound has the formula

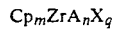

wherein Cp is unsubstituted or substituted cyclopentadienyl, m is 1, 2 or 3, preferably 2, A is a halogen, hydrogen, a $C_1$-$C_6$ alkyl group, a metalloalkyl group or a group of the following general formula:

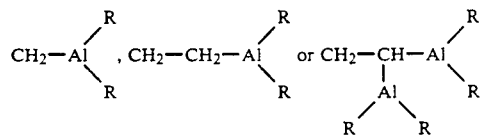

where R is a $C_1$-$C_{10}$ alkyl group, hydrogen, a halogen, or a metalloalkyl group, X is a halogen hydrogen or a $C_1$-$C_6$ alkyl group, n is 0, 1 or 2, q is 0, 1 or 2, providing that q+m+n is equal to the valence of Zr.

In the above formula of the zirconium compound the $C_1$-$C_6$ alkyl groups in the substituents A and X are the same or different and they are preferably straight chain normal alkyl groups such as methyl, ethyl, n-propyl, n-butyl, n-pentyl or n-hexyl; the halogen of the substituents A and X is the same or different and it is fluorine (F), chlorine (Cl), bromine (Br) or iodine (I); and suitable metalloalkyl groups of the substituents A and of R are the same or different and they are $Cp_2$ Ti—$CH_2$ or $Cp_2$ Zr—$CH_2$—$CH_2$, where Cp is the same as defined above. A is preferably a halogen, most preferably chlorine (Cl). Suitable substituents for Cp are $C_1$-$C_6$ alkyl groups. Suitable zirconium compounds are bis(cyclopentadienyl)zirconium dihalide or bis(cyclopentadienyl)zirconium monoalkyl monohalide, wherein the halide groups are preferably Cl and the alkyl groups are $C_1$–$C_6$ alkyls. Bis(cyclopentadienyl)zirconium dichloride is particularly preferred in one embodiment of the invention. Mixtures of the zirconium compounds may also be used.

The activator, also known as a catalyst promoter or cocatalyst, comprises a mixture of two compounds:

(i) an organoaluminum compound having the formula $$R_p'Al\ X_{(k-p)}' \text{ or } R_3'Al_2 X_3'$$

where R' is a $C_1$–$C_6$ alkyl group, p is 1 or 2, X' is a halogen and k is the valence of aluminum; and (ii) a dialkylmagnesium compound having the formula $$MgR_t'' \text{ or } Mg\ R_r''R_{(t-r)}'''$$

where R" is a $C_2$–$C_8$ alkyl group, R''' is different than R" and it is a $C_2$–$C_8$ alkyl group, t is the valence of magnesium and r is about 0.01 to about 1. In the organoaluminum compound, R' is preferably a short-chain, $C_1$–$C_6$ alkyl group, such as methyl, ethyl, n-propyl, n-hexyl or an isobutyl group; X' is F, Br, Cl or I, preferably Br or Cl, and p is preferably 2. In one embodiment of the invention, diethylaluminum chloride, dimethylaluminum chloride and ethylaluminum sesquichloride are the preferred aluminum compounds. Mixtures of the organoaluminum compounds may also be used.

The preferred dialkylmagnesium compounds are those soluble in hydrocarbons, such as alkanes or aromatics, e.g., heptane, hexane or toluene. In the dialkylmagnesium compound, R" and R''' are preferably $C_2$–$C_8$ alkyl groups, such as ethyl, n-propyl, n-butyl, sec-butyl, tert-butyl, n-hexyl or n-octyl. Thus, suitable dialkylmagnesium compounds are n-butylethylmagnesium, butylpropylmagnesium, di-n-butylmagnesium, di-sec-butylmagnesium, n-butyl,sec-butylmagnesium, di-tert-butylmagnesium, di-n-hexylmagnesium, di-n-octylmagnesium, butyl,n-octylmagnesium. The most preferred dialkylmagnesium compound in one embodiment of the invention is n-butyl,sec-butylmagnesium (generally known as dibutylmagnesium). Mixtures of the dialkylmagnesium compounds may also be used. The relative amounts of the organoaluminum compound to the dialkylmagnesium compound are not critical for the activation of the catalyst precursor but they may be critical to the polymerization activity of the activated catalyst composition. Thus, the relative amounts of the organoaluminum and the dialkylmagnesium compounds are such that the molar ratio of Al:Mg is about 0.1:1 to about 10:1, preferably about 3:1 to about 5:1. Conversely, the low molar ratios of Al:Mg, e.g., less than or equal to 1:1, produce catalyst compositions having relatively low activity. Neither the organoaluminum compounds nor the dialkylmagnesium compounds, if used separately, are capable of activating the zirconium compounds into active catalyst compositions.

Catalyst Activation

The catalyst precursor is combined with the catalyst activator in a conventional manner, e.g., by adding a solution of the precursor in a hydrocarbon solvent (such as halogenated hydrocarbon or an aromatic solvent, e.g., chloroform or toluene) to a solution of the activator in a hydrocarbon solvent. Alternatively, a solution of one of the components of the activator (e.g., the organoaluminum compound) in a solvent can be added to a solution of the precursor in a solvent, followed by the addition of the second component of the activator (the dialkyl magnesium compound) in a solvent.

The precursor may be activated in situ by adding the precursor and the mixture of the activators separately to the polymerization medium. The order of the mixing of the catalyst precursor and the activator components is not important. For example, the components of the activator can be mixed immediately prior to the introduction of the catalyst precursor, or, alternatively, the catalyst precursor and one of the components of the activator can be mixed first and the remaining component of the activator can be added later. It is also possible to combine both components of the activator before the introduction thereof into the polymerization medium, e.g., for up to about 2 hours prior to the introduction thereof into the polymerization medium at a temperature of from about $-40°$ to about $100°$ C.

Polymerization

Olefins, especially alpha-olefins, are polymerized with the catalysts prepared according to the present invention in any suitable process under conventional polymerization conditions, preferably in stirred reactors under slurry conditions. The reaction under slurry conditions is carried out in a suitable liquid rection medium, e.g., an aromatic or an aliphatic hydrocarbon, such as toluene or hexane, respectively. The catalyst activity and the structure of the polymer products are influenced by the nature of the monomer or comonomers, the type of the reaction medium and by the Al:Mg molar ratio, as will be apparent to those skilled in the art from the data of the Examples.

The linear polyethylene polymers prepared in accordance with the present invention are homopolymers of ethylene or copolymers of ethylene with one or more $C_3$–$C_{10}$ alpha-olefins. Thus, copolymers having two monomeric units are possible as well as terpolymers having three monomeric units. Particular examples of such polymers include ethylene/propylene copolymers, ethylene/1-butene copolymers, ethylene/1-hexene copolymers, ethylene/1-octene copolymers, ethylene/4-methyl-1-pentene copolymers, ethylene/1-butene/1-hexene terpolymers, ethylene/propylene/1-hexene terpolymers and ethylene/propylene/1-butene terpolymers. Ethylene/1-hexene is the most preferred copolymer polymerized in the process of and with the catalyst of this invention.

The linear low density polyethylene polymers produced in accordance with the present invention preferably contain at least about 80 percent by weight of ethylene units.

The following examples further illustrate the essential features of the invention. However, it will be apparent to those skilled in the art that the specific reactants and reaction conditions used in the Examples do not limit the scope of the invention.

The properties of the polymers produced in the Examples and any calculated process parameters were determined by the following test methods:

Melt Index (MI), $I_2$ ASTM D-1238—Condition E—Measured at 190° C.—reported as grams per 10 minutes (gm/10 min).

High Load Melt Index (HLMI), $I_{21}$: ASTM D-1238—Condition F—Measured at 10.5 times the weight used in the melt index test above.

Melting points of polymerization products were measured by the DSC (Differential Scanning Calorimetry) method. The sample heating rate of 2° C./min was employed.

Copolymer compositions were measured by the infrared spectroscopic method, as described in the article of T. E. Nowlin, Y. V. Kissin and K. P. Wagner, HIGH ACTIVITY ZIEGLER-NATTA CATALYST FOR THE PREPARATION OF ETHYLENE COPOLYMERS, published in 1988 in the Journal of Polymer Science:Part A:Polymer Chemistry, Volume 26, pages 755-764.

EXAMPLE 1

(Ethylene Polymerization)

100 ml of anhydrous toluene was transferred under nitrogen into a stainless-steel, 0.5-liter reactor equipped with a magnetic stirrer. The catalyst components were added to the reactor in the following sequence: (a) 7.5 mmol of diethylaluminum chloride (introduced as a 25 weight % solution in hexane), after which the reactor was heated to 60° C.; (b) 0.006 mmol of bis(cyclopentadienyl)zirconium dichloride (as 1 g/l solution in toluene); and (c) 2.0 mmol of dibutylmagnesium (as a 20 weight % solution in heptane). Ethylene was introduced into the reactor to maintain a total pressure of 180 psig. The polymerization reaction was carried out for 3 hours, and then the ethylene supply was stopped and the reactor allowed to cool. The reaction produced 10.6 g of linear, highly crystalline polyethylene with an $I_2$ of 3.0 g/10 min and a melting point of 134.2° C.

EXAMPLE 2

(Ethylene Polymerization)

The ethylene homopolymerization reaction was carried out in the same manner as that described in Example 1, except for the amount of bis(cyclopentadienyl)zirconium dichloride used (0.0015 mmol). The polymerization reaction was carried out at 80° C. for 2 hours and produced 15.9 g of polyethylene with low molecular weight ($I_2 = 107$ g/10 min).

EXAMPLE 3

(Ethylene/1-Hexene Copolymerization)

100 ml of anhydrous toluene and 20 ml of anhydrous 1-hexene was transferred under nitrogen into the 0.5-liter reactor. The catalyst components were added to the reaction in the following sequence: (a) 15.0 mmol of diethylaluminum chloride, after which the reactor was heated to 60° C.; (b) 0.009 mmol of bis(cyclopentadienyl)zirconium dichloride; and (c) 4.0 mmol of dibutylmagnesium. Ethylene was introduced into the reactor to maintain the total pressure of 180 psig. The copolymerization reaction was carried out for 3 hours and produced 22.5 g of ethylene/1-hexene copolymer with a $I_2$ of 31 g/10 min. The copolymer contained 5.2 weight % of 1-hexene and had a melting point of 126.8° C.

EXAMPLE 4

(Ethylene/1-Hexene Copolymerization)

100 ml of anhydrous toluene and 40 ml of anhydrous 1-hexene was transferred under nitrogen into the 0.5-liter reactor. The catalyst components were added to the reactor in the following sequence: (a) 1.5 mmol of diethylaluminum chloride; (b) 0.8 mmol of dibutylmagnesium, after which the reactor was heated to 60° C.; (c) 0.0041 g (0.0123 mmol) of solid bis(cyclopentadienyl)zirconium dichloride. Ethylene was introduced into the reactor to maintain the total pressure of 120 psig. The copolymerization reaction was carried out for 2 hours and produced 52.0 g of ethylene/1-hexene copolymer with a $I_2$ of 228 g/10 min. The copolymer contained 12.4 weight % of 1-hexene and had a melting point of 115.3° C.

EXAMPLE 5

(Ethylene/1-Hexene Copolymerization)

100 ml of anhydrous toluene and 40 ml of anhydrous 1-hexene was transferred under nitrogen into the 0.5-liter reactor. The catalyst components were added to the reactor in the following sequence: (a) 7.5 mmol of dimethylaluminum chloride (as a 25 weight % solution in heptane); (b) 2.0 mmol of dibutylmagnesium, after which the reactor was heated to 80° C.; (c) 0.006 mmol of bis(cyclopentadienyl)zirconium dichloride in toluene solution. Ethylene was introduced into the reactor to maintain the total pressure of 180 psig. The copolymerization reaction was carried out for 1 hour and produced 23.1 g of low molecular weight ethylene/1-hexene copolymer with a $I_2$ of 900 g/10 min and a melting point of 122.5° C.

EXAMPLE 6

(Ethylene/1-Hexene Copolymerization)

200 ml of anhydrous n-hexane and 50 ml of anhydrous 1-hexene was transferred under nitrogen into the 0.5-liter reactor. The catalyst components were added to the reactor in the following sequence: (a) 7.5 mmol of diethylaluminum chloride; (b) 2.0 mmol of dibutylmagnesium, after which the reactor was heated to 80° C.; (c) 0.009 mmol of bis(cyclopentadienyl)zirconium dichloride in toluene solution. Ethylene was introduced into the reactor to maintain the total pressure of 150 psig. The copolymerization reaction was carried out for 2 hours and produced 22.2 g of ethylene/1-hexene copolymer with a $I_{21}$ of 11.1 g/10 min. The copolymer contained 10.6 weight % of 1-hexene and had a melting point of 125.2° C.

EXAMPLE 7

(Ethylene/1-Hexene Copolymerization)

200 ml of anhydrous n-hexane and 50 ml of anhydrous 1-hexene was transferred under nitrogen into the 0.5-liter reactor. The catalyst components were added to the reactor in the following sequence: (a) 7.5 mmol of diethylaluminum chloride; (b) 2.0 mmol of dibutylmagnesium, after which the reactor was heated to 80° C.; (c) 0.009 mmol of bis(cyclopentadienyl)zirconium dichloride in toluene solution. Reactor was pressurized with 6 psia of hydrogen to control the molecular weight. Ethylene was introduced into the reactor to maintain the total pressure of 150 psig. The copolymerization reaction was carried out for 2 hours and produced 26.9 g of ethylene/1-hexene copolymer with a $I_2$ of 0.61 g/10 min and a melting point of 125.7° C.

EXAMPLE 8

(Ethylene/1-Hexene Copolymerization)

200 ml of anhydrous n-hexane and 50 ml of anhydrous 1-hexene was transferred under nitrogen into the 0.5-liter reactor. The catalyst components were added to the reactor in the following sequence: (a) 7.5 mmol of dimethylaluminum chloride; (b) 2.0 mmol of dibutylmagnesium, after which the reactor was heated to 80° C.; (c) 0.009 mmol of bis(cyclopentadienyl)zirconium dichloride in toluene solution. Ethylene was introduced into the reactor to maintain the total pressure of 180 psig. The copolymerization reaction was carried out for 2 hours and produced 26.2 g of ethylene/1-hexene copolymer with a $I_2$ of 1.1 g/10 min. The copolymer contained 3.2 weight % of 1-hexene and had a melting point of 127.8° C.

EXAMPLE 9

(Ethylene/1-Hexene Copolymerization)

100 ml of anhydrous toluene and 40 ml of anhydrous 1-hexene was transferred under nitrogen into the 0.5-liter reactor and the reactor was heated to 60° C. The catalyst components were added to the reactor in the following sequence: (a) 4.5 mmol of diethylaluminum fluoride (introduced as a 25 weight % solution in heptane); (b) 0.006 mmol of bis(cyclopentadienyl)zirconium dichloride (as 1 g/l solution in toluene); and (c) 1.0 mmol of dibutylmagnesium (as a 20 weight % solution in heptane). Ethylene was introduced into the reactor in a sufficient amount to maintain the total pressure of 180 psig. The copolymerization reaction was carried out for 2 hours and produced 15.6 g of ethylene/1-hexene copolymer. The copolymer contained 2.4 weight % of 1-hexene and had the $I_2$ value of 0.74 g/10 min; its melting point was 118.6° C.

It will be apparent to those skilled in the art that the specific embodiments discussed above can be successfully repeated with ingredients equivalent to those generically or specifically set forth above and under variable process conditions.

From the foregoing specification, one skilled in the art can readily ascertain the essential features of this invention and without departing from the spirit and scope thereof can adapt it to various diverse applications.

I claim:

1. A process for polymerizing ethylene alone or in admixture with at least one $C_3$-$C_{10}$ alpha olefin comprising contacting the ethylene or said admixture under olefin polymerization condition with a catalyst composition comprising:

a zirconium compound, containing pi-bonded organic ligands and having the formula:

$$Cp_mZrA_nX_q$$

wherein Cp is unsubstituted or substituted cyclopentadienyl, m is 1 or 2 or 3, A is a halogen, X is a halogen, hydrogen or $C_1$-$C_6$ alkyl group, providing that q+m+n is equal to the valence of zirconium;

in combination with (1) dimethyl aluminum chloride, diethyl aluminum chloride, diethyl aluminum fluoride or mixtures thereof; and (2) a dialkylmagnesium compound having the formula:

$$Mg\ R_t''\ or\ Mg\ R_r''R_{(t-r)}'''$$

where R" is a $C_2$-$C_8$ alkyl group, R'" is different than R" and it is a $C_2$-$C_8$ alkyl group, t is the valence of magnesium and r is about 0.01 to about 1, wherein said dimethylaluminum chloride, diethylaluminum chloride or said diethyl aluminum fluoride and said dialkyl magnesium is present in an amount to provide an Al:Mg molar ratio of at least 1:1 and up to about 10:1; and recovering polyolefin product.

2. The process of claim 1 wherein the catalyst comprises bis(cyclopentadienyl)zirconium dichloride;

in combination with (1) dimethyl aluminum chloride, diethyl aluminum chloride diethyl aluminum fluoride or mixtures thereof; and (2) dibutyl magnesium, wherein said dimethylaluminum, diethylaluminum chloride or said diethyl aluminum fluoride and said dibutyl magnesium is present in an amount to provide an Al:Mg molar ratio of at least 1 and up to about 10:1.

3. The process of claim 1, wherein the molar ratio ranges from about 3:1 to about 5:1.

4. The process of claim 1, wherein the catalyst is prepared by heating (1) to a temperature of at least 60° C. and then combining it with said zirconium compound and (2).

5. The process of claim 2, wherein the molar ratio ranges from about 3:1 to about 5:1.

6. The process of claim 2, wherein the catalyst is prepared by heating (1) to a temperature of at least 60° C. and then combining it with said zirconium compound and (2).

7. The process of claim 1, wherein the ethylene is admixed with said $C_3$-$C_{10}$ alpha olefin.

8. The process of claim 2, wherein the ethylene is admixed with said $C_3$-$C_{10}$ alpha olefin.

9. The process of claim 7, wherein the process is a slurry polymerization process.

10. The process of claim 8, wherein the process is a slurry polymerization process.

11. The process of claim 1, wherein the process is a slurry polymerization process.

12. The process of claim 2, wherein the process is a slurry polymerization process.

13. An ethylene polymerization or copolymerization catalyst comprising:

a zirconium compound, containing pi-bonded organic ligands and having the formula:

$$Cp_mZrA_nX_q$$

wherein Cp is unsubstituted or substituted cyclopentadienyl, m is 1 or 2 or 3, A is a halogen, X is a halogen, hydrogen or $C_1$-$C_6$ alkyl group, providing that q+m+n is equal to the valence of zirconium;

in combination with (1) dimethyl aluminum chloride, diethyl aluminum chloride, diethyl aluminum fluoride or mixtures thereof; and (2) a dialkylmagnesium compound having the formula:

$$Mg\ R_t'\ or\ Mg\ R_r''R_{(t-r)}'''$$

where R" is a $C_2$-$C_8$ alkyl group, R'" is different than R" and it is a $C_2$-$C_8$ alkyl group, t is the valence of magnesium and r is about 0.01 to about 1, wherein said dimethylaluminum chloride, diethylaluminum chloride or said diethyl aluminum fluoride and said dialkyl magnesium is present in an amount to provide an Al:Mg molar ratio of at least 1:1 and up to about 10:1.

14. The catalyst of claim 13, wherein the molar ratio ranges from about 3:1 to about 5:1.

15. The catalyst of claim 13, wherein the catalyst is prepared by heating (1) to a temperature of at least 60° C. and then combining it with said zirconium compound and (2).

16. The catalyst of claim 13, wherein $R'''$ and $R'''$ are methyl, ethyl, n-propyl or n-butyl.

17. The catalyst of claim 13, wherein the magnesium compound is n-butyl, sec-butylmagnesium.

18. An ethylene polymerization or copolymerization catalyst comprising:
a zirconium compound, containing pi-bonded organic ligands and having the formula:

$$Cp_mZrA_nX_q$$

wherein Cp is unsubstituted or substituted cyclopentadienyl, m is 1 or 2 or 3, A is a halogen, X is a halogen, hydrogen or $C_1$-$C_6$ alkyl group, providing that $q+m+n$ is equal to the valence of zirconium;
in combination with
(1) dimethyl aluminum chloride, diethyl aluminum chloride, diethyl aluminum fluoride or mixtures thereof; and
(2) dibutyl magnesium,
wherein said dimethylaluminum chloride, diethylaluminum chloride or said diethyl aluminum fluoride and said dialkyl magnesium is present in an amount to provide an Al:Mg molar ratio of at least 1:1 and up to about 10:1.

19. The catalyst of claim 18, wherein the molar ratio ranges from 3:1 to 5:1.

20. The catalyst of claim 18, wherein the catalyst is prepared by heating (1) to a temperature of at least 60° C. and then combining it with said zirconium compound and (2).

21. The catalyst of claim 18, wherein the zirconium compound is bis(cyclopentadienyl)zirconium dichloride.

22. An ethylene polymerization or copolymerization catalyst comprising
bis(cyclopentadienyl)zirconium dichloride in combination with
(1) dimethyl aluminum chloride, diethyl aluminum chloride, diethyl aluminum fluoride or mixtures thereof; and
(2) dibutyl magnesium,
wherein said dimethylaluminum chloride diethylaluminum chloride or said diethyl aluminum fluoride and said dibutyl magnesium is present in an amount to provide an Al:Mg molar ratio of at least 1 and up to about 10:1.

23. The catalyst of claim 22, wherein the molar ratio ranges from about 3 to about 5.

* * * * *

UNITED STATES PATENT AND TRADEMARK OFFICE
CERTIFICATE OF CORRECTION

PATENT NO. : 5,086,135
DATED : February 4, 1992
INVENTOR(S) : Y.V. Kissin It is certified that error appears in the above-identified patent and that said Letters Patent is hereby corrected as shown below:

Title Page:
Abstract (Last Formula) "$R_{(t-r)}''$" -- $R_{(t-r)}'''$ --
Column 8:
Claim 13, line 62, "$R_t'$" -- $R_t''$ --

Signed and Sealed this

Sixth Day of July, 1993

Attest:

MICHAEL K. KIRK

*Attesting Officer*   Acting Commissioner of Patents and Trademarks